Nov. 4, 1969   J. M. STEINKE   3,475,976
TWO-CYCLE TRANSMISSION WITH ADJUSTABLE VELOCITY PROFILE
Filed Jan. 2, 1968   2 Sheets-Sheet 1
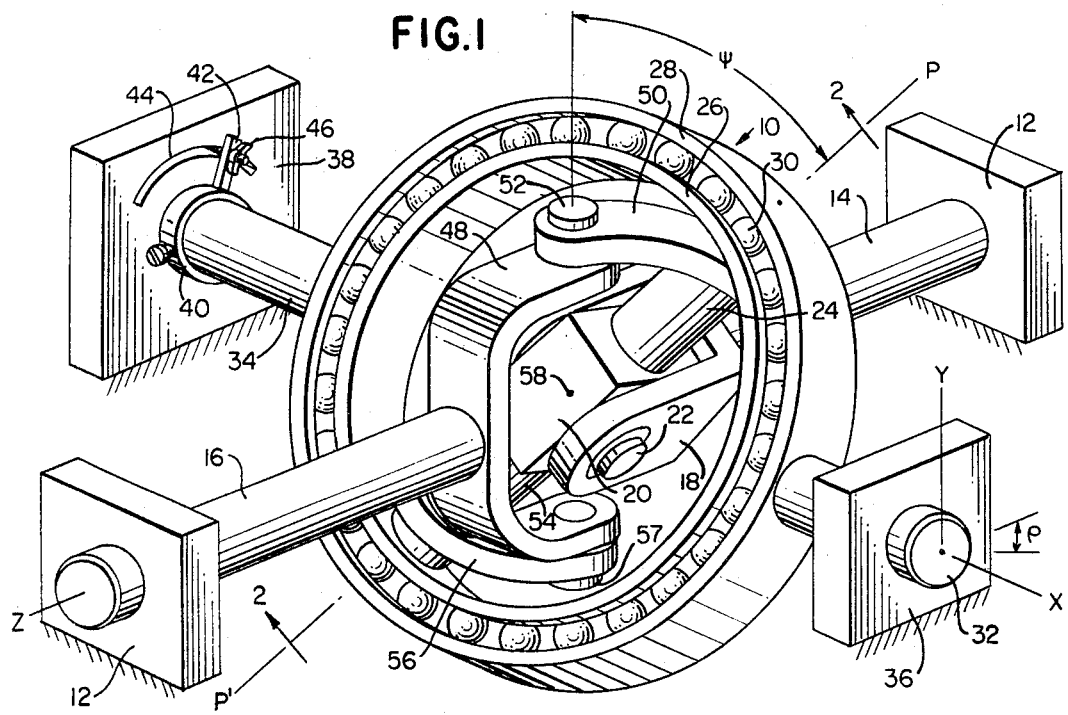
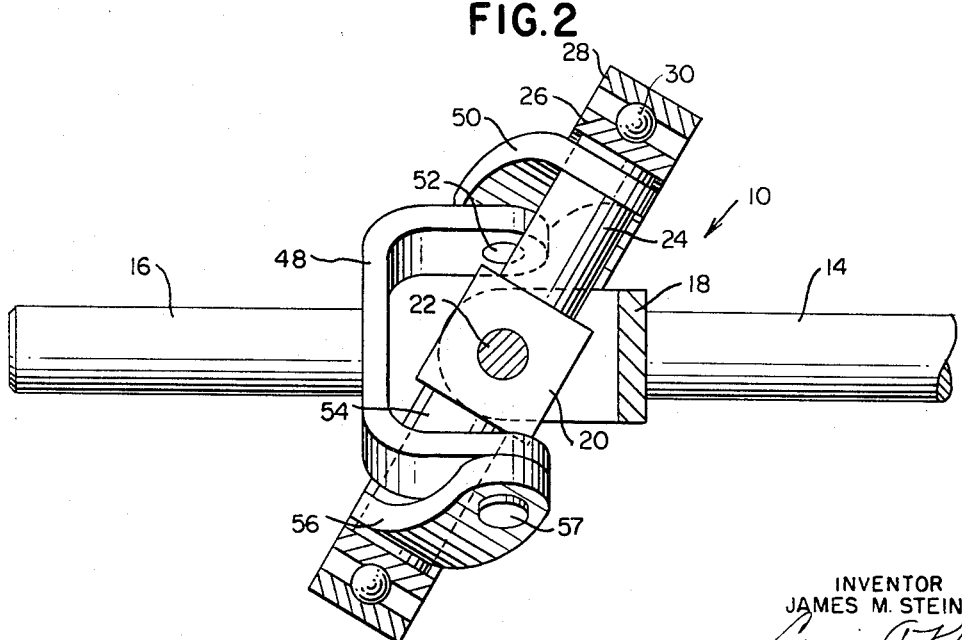
INVENTOR
JAMES M. STEINKE
BY
HIS ATTORNEYS

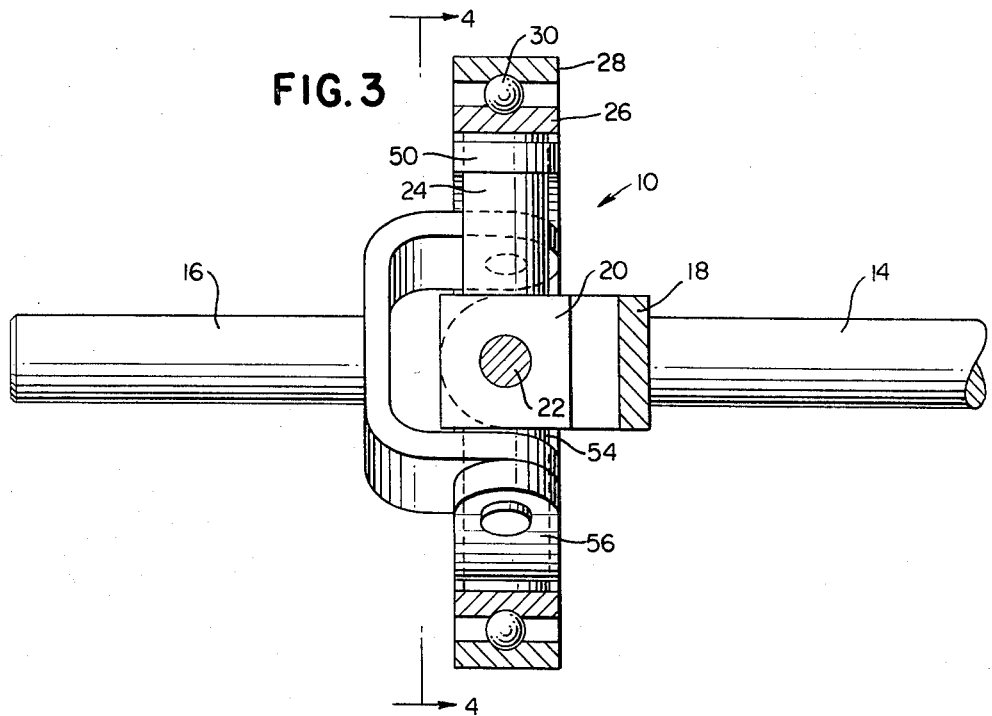
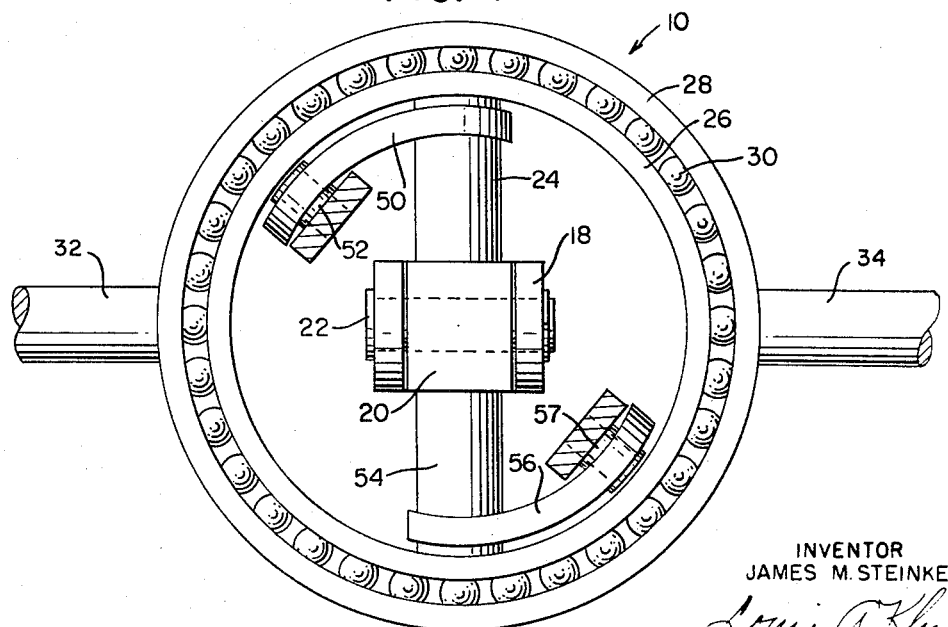

United States Patent Office 3,475,976
Patented Nov. 4, 1969

3,475,976
TWO-CYCLE TRANSMISSION WITH ADJUSTABLE VELOCITY PROFILE
James M. Steinke, Fairport, N.Y., assignor to The National Cash Register Company, Dayton, Ohio, a corporation of Maryland
Filed Jan. 2, 1968, Ser. No. 694,966
Int. Cl. F16h *21/12*
U.S. Cl. 74—63          3 Claims

ABSTRACT OF THE DISCLOSURE

A transmission device having aligned input and output shafts with yokes on their adjacent ends. The yoke on the input shaft rotatably supports a block having a pin projecting therefrom with the outer end thereof secured to the inner race of a bearing utilized as a support structure. An arcuate link is pivotally joined to said outer end and to one leg of the yoke on said output member. The outer race of said bearing may be adjustably fixed relative to the frame means of the device to provide for a change in the velocity fluctuation of the output shaft.

Background of the invention

This invention relates to transmission devices which may be supplied with an input of constant velocity rotation to produce a periodic velocity fluctuation in the output shaft thereof.

One of the problems with prior transmission devices of the intermittent, rotary-motion type is that they generally include cams, gears, or sliding components which are often difficult and expensive to manufacture. Once constructed, these prior-art devices are difficult to alter to obtain different periodic velocity fluctuations, if this is possible at all.

In contrast with the prior-art devices, applicant's device uses purely rotational components which are easy and inexpensive to manufacture. Another feature of applicant's device lies in the ease with which the device can be adjusted to provide a range of periodic velocity fluctuations. The displacement characteristics of the output shaft of applicant's device are smooth and continuous, and the device can be constructed to accommodate a wide range of size and torque requirements while providing velocity fluctuations attaining frequencies of approximately 7,200 per minute.

Summary

The transmission device of this invention provides a wide variety of periodic velocity fluctuations in the output shaft thereof while the input shaft thereof is supplied with a constant velocity rotation. The device includes an input shaft and an output shaft which are in spaced axial alignment and which are rotatably mounted in a frame means. The input and output shafts have first and second connecting members, respectively, connected to the adjacent ends thereof. A first ring member is rotatably mounted in a much the same manner as is a second ring member in much the same manner as is done in a ball bearing construction having inner and outer races. The second ring member of applicant's device has diametrically positioned shaft members projecting from the exterior thereof, and the shaft members are rotatably mounted in said frame means. A support member is rotatably mounted in said first connecting member and has a stud projecting therefrom whose remaining end is secured to the first ring member. An arcuately shaped link has one end pivotally joined to said stud near said first ring, and its remaining end is pivotally joined to said second connecting member. The longitudinal axes of said input and output shafts, said stud, and said diametrically positioned shaft members intersect in a common point located between said input and output shafts. By inclining the longitudinal axes of said first and second ring members at different angles relative to the longitudinal axis of said input and output shafts, different periodic velocity fluctuations may be obtained.

Brief description of the drawings

FIG. 1 is a general view in perspective of the motion transmission device of this invention showing the various elements thereof with the inner and outer ring members positioned to produce a variable velocity in the output shaft thereof.

FIG. 2 is an elevational view, partly in cross section, which is taken along the line 2—2 of FIG. 1.

FIG. 3 is an elevational view, partly in cross section, showing the inner and outer ring members in a position which produces the same motion in the output shaft as the motion which is imparted to the input shaft of the device.

FIG. 4 is an end view, in elevation, of the device as shown in FIG. 3 and is taken along the line 4—4 thereof.

Description of the preferred embodiment

FIG. 1 shows the general arrangement of the transmission device 10 of this invention. The device 10 includs a frame means 12, shown only diagrammatically) for rotatably supporting an input shaft 14 and an output shaft 16, which are positioned in spaced axial alignment with each other. The input and output shafts 14 and 16 respectively, each have connecting means on their adjacent ends as follows.

The connecting mans on the input shaft 14 (FIG. 1) includes a bifurcated link or yoke member 18, which is secured to one end thereof, as shown in the drawings, and also includes a support member 20, which is rotatably supported on a cross pin 22, passing through the legs of the yoke member 18. Projecting from said support member 20 is a rod member 24, which has one end secured thereto and the remaining end secured to the inner wall of an inner ring member 26.

The inner ring member 26 is supported for rotation in an outer ring member 28 by a construction similar to that of a ball bearing having inner and outer races. The inner and outer ring members 26 and 28, respectively, have opposing annular recesses therein to receive the ball bearings 30 therebetween, thereby rotatably supporting the inner ring member 26 and preventing axial movement of it relative to the outer ring member 28. The outer ring member 28 has diametrically positioned shafts 32 and 34 projecting from its outside wall, and these shafts are rotatably supported in the frame means 36 and 38 (FIG. 1). The shaft 34 has a locking collar 40 secured thereto to rotate therewith, and the collar 40 has a radially positioned arm 42 extending therefrom, as shown in FIG. 1. The frame means 38 has an arcuately shaped slot 44, through which a fastener 46 on the arm 42 extends. The fastener 46 has a wing nut which is used to adjustably position and lock the arm 42 relative to the frame means 38 to thereby adjustably fix the longitudinal axis of the inner and outer ring members 26 and 28 at different angles relative to the longitudinal axis of the shafts 14 and 16.

The output shaft (FIG. 1) has a connecting means securely attached to the end thereof adjacent to the shaft 14, which connecting means includes a bifurcated link or yoke member 48. To one leg of the yoke member 48, one end of an arcuate shaped link 50 is pivotally joined by a pin 52, while the remaining end of the link 50 is pivotally joined to the rod member 24 near the inner ring member 26. To improve the dynamic stability of the device 10, a duplicate rod member 54 (identical to the rod member 24), an arcuately shaped link 56 (identical to the link 50), and a pin 57 (identical to the pin 52) may be provided diametrically opposite from their counterparts.

The various elements of the transmission device 10 are arranged as follows. The longitudinal axis of the input and output shafts 14 and 16, the longitudinal axis of the shafts 32 and 34, the longitudinal axis of the rod members 24 and 54, the longitudinal axis of the pins 52 and 57, and the longitudinal axis of the cross pin 22 all pass through a common intersection point 58 (FIG. 1), which lies between the input and output shafts. The shafts 32 and 34 are perpendicular to the shafts 14 and 16.

The device 10 provides two different types of outputs as follows. When the longitudinal axis of the inner and outer ring members 26 and 28, respectively, is coincident with the longitudinal axis of the shafts 14 and 16 (as shown in FIG. 3), the output shaft 16 rotates at the same angular velocity as the input shaft 14, with an initial angular phase lag of $\Psi$ (FIG. 1). Once the links 50 and 56 become aligned with the inner ring member 26, as shown in FIGS. 3 and 4, the output shaft 16 rotates with the same rotational velocity as the input shaft 14, with no velocity fluctuation.

When the longitudinal axis of the inner ring member 26 is inclined away from the coincident position with the longitudinal axis of the input shaft 14, as, for example, at the inclined angle $\rho$ of FIG. 1, the output shaft 16 will assume a velocity fluctuation occurring twice for each complete revolution of the input shaft 14. Under these circumstances, the maximum velocity occurs only when the (P–P') axis (FIG. 1) lies in the Y and Z planes. Y and Z axes are also shown in FIG. 1 to orient the various axes of the device 10. By controlling the included angle $\Psi$ for the arcuately shaped link 50, and the angle $\rho$ (FIG. 1) through which the inner ring member 26 may be adjustably inclined (via the arm 42 and the fastener 46), different velocity fluctuations may be obtained in the output shaft 16, with two such fluctuations occurring for each complete revolution of the input shaft 14.

The displacement characteristics of the device 10 are smooth and continuous and provide a wide range of periodic velocity fluctuations while the device is in operation. The device 10 can be used in equipment such as document accelerators, document feeders, or separators which require that the article being fed have its transport velocity changed from one level to another to match a second level of velocity. The device 10 may also be useful as an agitator for mixing liquids, for example, by simply attaching a mixture paddle to the output shaft thereof.

What is claimed is:

1. A transmission device for converting an input of constant velocity rotation to an output having a periodic velocity fluctuation therein comprising:
    frame means;
    an input shaft and an output shaft rotatably mounted in spaced axial alignment in said frame means; said input and output shafts having first and second bifurcated connecting members respectively secured to their adjacent ends;
    a ring member;
    means for rotatably supporting said ring member in said frame means;
    a cross pin mounted in the arms of said first bifurcated member and whose longitudinal axis is perpendicular to the longitudinal axis of said input shaft;
    a support member rotatably mounted on said cross pin;
    a rod member having one end secured to said support member so that the longitudinal axis of the rod member pivots in a plane passing through the longitudinal axis of said input shaft, the remaining end of said rod member being secured to the inner wall of said ring member along a radial line thereof; and
    an arcuately-shaped link having one end pivotally joined to said remaining end of said rod member and the other end thereof pivotally joined to one arm of said second bifurcated connecting member;
    said means for rotatably supporting said ring member being adaptable to adjustably position said ring member so that its longitudinal axis lies at an acute angle relative to the longitudinal axis of said input shaft.

2. The device as claimed in claim 1 in which said means for adjustably fixing the longitudinal axis of said outer ring member is operatively connected to one of said stud members,
    said ring and outer ring members being inner and outer races respectively of a ball bearing having bearings positioned therebetween.

3. The device as claimed in claim 1 in which said means for rotatably supporting said ring member comprises:
    an outer ring member having diametrically positioned stud members rotatably mounted in said frame means,
    said ring member being rotatably mounted within said outer ring member while being fixed against axial movement relative to said outer ring member;
    and means for adjustably fixing the longitudinal axis of said outer ring member relative to the axis of said input shaft.

References Cited

UNITED STATES PATENTS

| 860,155 | 7/1907 | Russell | 74—63 |
| 2,020,123 | 11/1935 | Pollard | 74—63 |
| 2,324,062 | 7/1943 | Brooks | 64—18 |

FOREIGN PATENTS

| 684,020 | 3/1930 | France. | | |

FRED C. MATTERN Jr., Primary Examiner

W. S. RATLIFF, Jr., Asssistant Examiner